US009823631B1

(12) United States Patent
Loo et al.

(10) Patent No.: US 9,823,631 B1
(45) Date of Patent: Nov. 21, 2017

(54) NOTEBOOK COMPUTER WITH MOTORIZED DISPLAY POSITIONING (71) Applicant: Google Inc., Mountain View, CA (US)

(72) Inventors: Kenneth Ryan Loo, San Jose, CA (US); Kenneth Thomas McAlpine, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 913 days.

(21) Appl. No.: 14/043,167

(22) Filed: Oct. 1, 2013

(51) Int. Cl.
*G05B 15/02* (2006.01)
*H02K 7/116* (2006.01)
*H05K 5/00* (2006.01)

(52) U.S. Cl.
CPC .......... *G05B 15/02* (2013.01); *H02K 7/116* (2013.01); *H05K 5/0017* (2013.01)

(58) Field of Classification Search
CPC ... C23C 14/0641; C23C 14/542; C23C 14/08; C23C 14/28
See application file for complete search history.

(56) References Cited

U.S. PATENT DOCUMENTS

| 4,560,912 | A | * | 12/1985 | Jonsson | ................ G01S 17/026 250/221 |
| 4,779,240 | A | * | 10/1988 | Dorr | ....................... G01S 15/04 367/140 |
| 5,043,846 | A | | 8/1991 | Kinoshita | |
| 5,085,394 | A | | 2/1992 | Torii | |
| 5,168,426 | A | | 12/1992 | Hoving et al. | |
| 5,200,913 | A | | 4/1993 | Hawkins et al. | |
| 5,267,123 | A | | 11/1993 | Boothroyd et al. | |
| 5,278,725 | A | | 1/1994 | Konno et al. | |
| 5,548,478 | A | * | 8/1996 | Kumar | ................... G06F 1/162 16/223 |
| 5,566,048 | A | | 10/1996 | Esterberg et al. | |
| 5,754,395 | A | | 5/1998 | Hsu et al. | |
| 5,844,543 | A | | 12/1998 | Tamura et al. | |
| 6,125,029 | A | | 9/2000 | Sasaki et al. | |
| 6,487,068 | B1 | | 11/2002 | Rahemtulla | |

(Continued)

FOREIGN PATENT DOCUMENTS

EP       1187261 A2    3/2002

OTHER PUBLICATIONS

Arduino', on-line Wikipedia article https://en.wikipedia.org/wiki/Arduino, downloaded Dec. 15, 2016, p. 1-10.*

(Continued)

*Primary Examiner* — Mohammad Ali
*Assistant Examiner* — Bernard G Lindsay
(74) *Attorney, Agent, or Firm* — Lerner, David, Littenberg, Krumholz & Mentlik, LLP (57) ABSTRACT

A portable computer that has a motorized hinge structure capable of moving the lid between an open and closed position. The movement of the lid is based on input from a plurality of sensors. One sensor may be configured to determine whether the user is within a predetermined threshold distance. Another sensor may be capable of detecting whether the user has made direct contact with the laptop. In one embodiment, the computer may have an image sensor configured to detect the user's face and continuously adjust the angle and position of the lid to keep the face in the field of view of the camera and/or keep the lid in the optimum viewing position.

18 Claims, 10 Drawing Sheets

(56) References Cited

U.S. PATENT DOCUMENTS

| | | |
|---|---|---|
| 6,867,961 B2 | 3/2005 | Choi |
| 6,870,730 B2 | 3/2005 | Riddiford |
| 6,925,684 B2 | 8/2005 | Kang et al. |
| 7,024,727 B1 | 4/2006 | Huang et al. |
| 7,027,297 B1 | 4/2006 | Mizuno et al. |
| 7,355,843 B2 | 4/2008 | Riddiford |
| 7,583,496 B2 | 9/2009 | Lai |
| 7,586,743 B2 | 9/2009 | Lin |
| 7,602,606 B2 | 10/2009 | Schlesener et al. |
| 7,616,435 B2 | 11/2009 | Wang |
| 7,787,242 B2 | 8/2010 | Schwager et al. |
| 7,848,094 B2 | 12/2010 | Wang et al. |
| 7,898,815 B2 | 3/2011 | Tanaka et al. |
| 7,916,473 B2 | 3/2011 | Jang |
| 8,032,987 B2 | 10/2011 | Oshima et al. |
| 8,050,017 B2 | 11/2011 | Riddiford |
| 8,200,300 B2 | 6/2012 | Wang et al. |
| 8,248,772 B2 | 8/2012 | Dai et al. |
| 8,248,788 B2 | 8/2012 | Wu et al. |
| 8,248,789 B2 | 8/2012 | Wu et al. |
| 8,250,711 B1 | 8/2012 | Chen et al. |
| 8,254,116 B2 | 8/2012 | Wu et al. |
| 8,369,076 B2 | 2/2013 | Chuang et al. |
| 8,385,063 B2 | 2/2013 | Zhu et al. |
| 8,390,997 B1 | 3/2013 | Dominy et al. |
| 8,514,558 B2 | 8/2013 | Song |
| 8,559,623 B2 | 10/2013 | Chen et al. |
| 8,654,520 B2 | 2/2014 | Lin et al. |
| 8,713,757 B2 | 5/2014 | Chen et al. |
| 8,713,758 B2 | 5/2014 | Mitsui et al. |
| 8,780,544 B2 | 7/2014 | Liang et al. |
| 8,792,231 B2 | 7/2014 | Derryberry |
| 8,934,231 B2 | 1/2015 | Liu et al. |
| 9,383,777 B1* | 7/2016 | Riddiford ............. G06F 1/1681 |
| 2004/0216273 A1 | 11/2004 | Kang et al. |
| 2005/0046374 A1* | 3/2005 | Ogawa ................. G06F 1/1616 |
| | | 318/614 |
| 2005/0139740 A1 | 6/2005 | Chen et al. |
| 2006/0077622 A1 | 4/2006 | Keely et al. |
| 2006/0152893 A1 | 7/2006 | Chen |
| 2006/0267947 A1 | 11/2006 | Nishiyama et al. |
| 2007/0030634 A1 | 2/2007 | Maskatia |
| 2007/0052388 A1* | 3/2007 | Wilson ..................... A45C 5/14 |
| | | 320/114 |
| 2007/0104467 A1 | 5/2007 | Wang et al. |
| 2007/0289099 A1* | 12/2007 | Jung ...................... G06F 1/1616 |
| | | 16/354 |
| 2008/0101003 A1 | 5/2008 | Lin |
| 2008/0174942 A1 | 7/2008 | Yang et al. |
| 2008/0304217 A1* | 12/2008 | Lai ........................ G06F 1/1616 |
| | | 361/679.26 |
| 2009/0016002 A1 | 1/2009 | Lai et al. |
| 2009/0131127 A1 | 5/2009 | Hung |
| 2009/0167032 A1* | 7/2009 | Grossman ................. F03G 5/06 |
| | | 290/1 R |
| 2011/0023272 A1 | 2/2011 | Huang |
| 2011/0170812 A1 | 7/2011 | Lee |
| 2011/0177850 A1 | 7/2011 | Griffin et al. |
| 2011/0194233 A1 | 8/2011 | Ahn et al. |
| 2012/0092820 A1 | 4/2012 | Hautamaki et al. |
| 2012/0217855 A1 | 8/2012 | Chen et al. |
| 2012/0328222 A1 | 12/2012 | Chen et al. |
| 2013/0091537 A1* | 4/2013 | Parla ....................... G06F 21/00 |
| | | 726/1 |
| 2013/0308268 A1 | 11/2013 | Tani |
| 2014/0001941 A1 | 1/2014 | Liang et al. |
| 2014/0015448 A1* | 1/2014 | Wikander ................. G06K 9/20 |
| | | 318/3 |
| 2014/0029175 A1* | 1/2014 | Li .......................... G06F 1/1675 |
| | | 361/679.01 |
| 2014/0125553 A1 | 5/2014 | Kim |
| 2014/0168878 A1 | 6/2014 | Jheng |
| 2015/0009611 A1 | 1/2015 | Constin |

OTHER PUBLICATIONS

LCD Group, 'Making the Right Display Choice for Industrial Applications', Sharp, 2007, p. 1-10.*
"iTouchless 8-Gallon Trash Can with Infrared-Sensor Lid Opener, Stainless Steel" Walmart.com [online]. [Retrieved Jul. 30, 2013]. <http://www.walmart.com/ip/iTouchless-Stainless-Steel-Trash-Can-With-Infrared-Sensor-Lid-Opener-IT08RCB/10247557>, 2 pages.
Tobias Toft, "The motorised laptop" [online]. Jul. 2009. [Retrieved Jun. 24, 2013]. <http://portfolio.tobiastoft.dk/The-motorised-laptop>, 3 pages.

* cited by examiner

NOTEBOOK COMPUTER WITH MOTORIZED DISPLAY POSITIONING

BACKGROUND

Portable computers are often configured in a "notebook" or "clamshell" arrangement. These types of computers most often package a majority of the internal components associated with a computer into a base assembly. Such components include a printed circuit board that carries a computer's central processor, any additional peripheral processors, and at least some of the computer's memory. Additionally, the base can house one or more batteries to provide portable power for the computer, internal storage such as a hard drive or a solid state drive, mechanical connections for peripheral devices and related circuitry, the computer's input devices, and circuitry for a wired or wireless internet connection (such as via WiFi or a cellular data network).

In a notebook or clamshell arrangement, the lid assembly is commonly attached to the base and includes a video display and some additional components, such as various types of antennae, video cameras, microphones, or the like. The video display can, for example, be in the form of LCD screen and is typically designed to be viewable from a range of angles, known as the viewing angle. When viewing from angles in excess of the viewing angle the display may appear blurry or washed out. The viewing angle for an LCD screen may be 60°, for example, which allows it to be viewed from +/−30° from the horizontal axis, which may be perpendicular to the screen. In some situations, the viewing angle may be biased so that the middle of the viewing angle is not necessarily perpendicular to the screen but rather may be offset down 10° such that the screen is viewable from +20° to −40°.

The lid assembly is typically repositionable through the use of a hinge positioned at a back edge of the base (the edge that is positioned farthest from the user during use of the computer). The hinge can include elements to provide internal friction to maintain a position of the lid selected by the user. The user may adjust the positioning of the lid to optimize the user's view of the screen or to adjust the field of view of a video camera built into the lid.

Notebook computers typically require the user to manually adjust the position of the lid, which requires the user to be within arm's length of the computer. Depending on the use of the computer the user may not always be close enough or may not be willing to constantly adjust the lid position. For example, if the user is watching a movie they may not be within arms-length of the computer. Alternatively, if the user is presenting information to a videoconference audience, the user may not be able to continuously adjust the position of the lid to keep their face in view of the video camera.

BRIEF SUMMARY

An aspect of the present disclosure relates to a portable computer that is capable of automatically opening, closing and adjusting the lid of a computer. For example, it may automatically open and/or unlock the computer when a user approaches or it may automatically close and/or lock the computer when the user leaves. It may also continuously adjust the position of the lid so that the user has an optimized view of the screen and the lid's camera has an optimized view of the user's face.

According to one aspect of the disclosure, the portable computer has a base assembly with a keyboard, a lid assembly with a display, and a hinge structure configured to attach the lid assembly to the base assembly such that the lid assembly is moveable with respect to the base. The hinge structure may be interconnected with a motor and configured to move the lid assembly between a closed position and an open position. The computer has a sensor configured to determine whether a user is within a predetermined threshold distance from the computer. The computer also has a processor in communication with both the sensor and the motor and configured to trigger the movement of the lid assembly when the user is within a predetermined threshold distance from the computer.

DETAILED DESCRIPTION

Figure 1A:
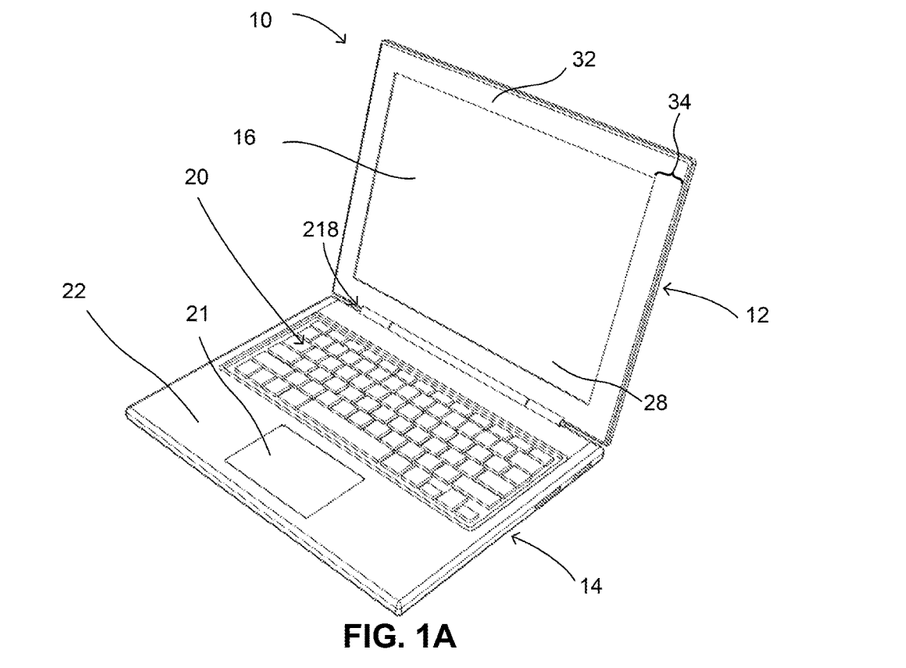
FIG. 1A illustrates a notebook computer in an open position.
Figure 1B:
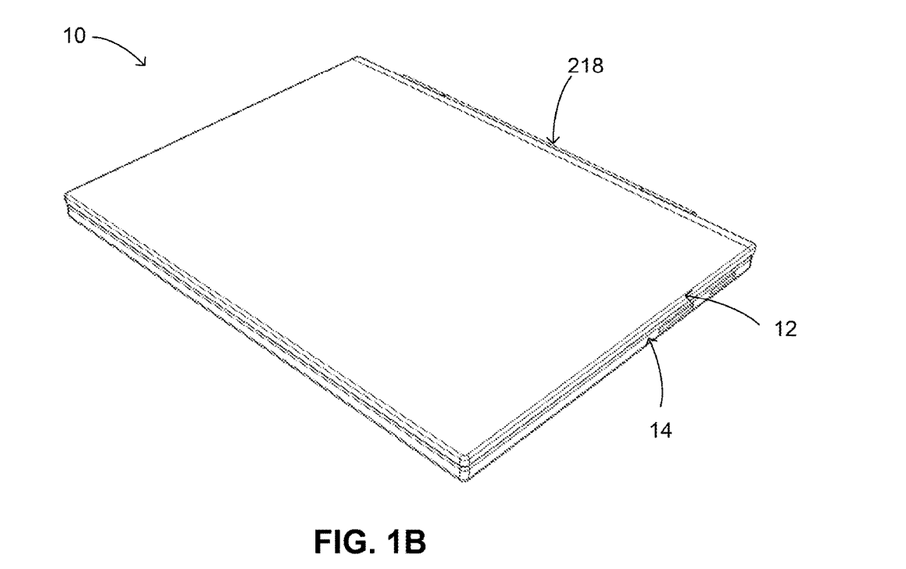
FIG. 1B illustrates the notebook computer of FIG. 1A in a closed position.

Turning to the drawing figures, FIGS. 1A & B show a portable computer 10 in a form that can be generally referred to as a "notebook" or "clamshell" computer with a base 14 configured to rest on a surface and to support a lid 12 including a screen 16. Lid 12 is connected to base by a hinge 218. Such a connection allows the lid 12 to close against the base 14, as shown in FIG. 1B, and to be opened by rotation away therefrom into a user-selectable viewing position during use of computer 10, an example of which is shown in FIG. 1A.

Base 14 includes a keyboard 20 and a touch-based input device (e.g., trackpad) 221 positioned on an upper face 22 of base 14 such that they are accessible for use as an input device by a user when computer 10 is in an open position, as shown in FIG. 1A.

The screen 16 is disposed at an inside face 32 of lid 12 that can include a bezel area 34 that surrounds and frames screen 16. Bezel area 34 can be of a thickness necessary to retain the internal components associated with screen 16 or to give a desired strength to lid 12. Face 32 can be defined on a clear substrate of a material, such as glass or the like, and screen 16 can be an area of such a substrate that overlies a display such as an LCD panel or the like. In such an example, the substrate, and accordingly the face 32 can extend outwardly over at least a portion of bezel 34. In other examples, face 32 can be partially defined on a substrate that overlies a display, the remaining portion of face 32 that is defined by another piece of material that surrounds the display. The overall size of lid 12 can be dictated at least in part by the size of the screen 16. The screen dimension can be measured by a combination of the ratio of screen width to height and a diagonal dimension of the screen 16. In an example, screen 16 can be in a widescreen format with a 16:9 width-to-height ratio. Further, screen can have a diagonal dimension of, for example, about 11 inches, about 13", about 15", or other intermediate, greater, or lesser dimensions. The overall dimensions of lid 12 can reflect the overall ratio and diagonal size of screen 16, with an allowance for the desired bezel size and additional room for other features such as the attachment to base 14 or other design features.

The computer 10 may also include a motor connected to the hinge structure 218 and configured to automatically open, close, and/or adjust the position of the computer lid without contact from a user. As shown in the detail view of FIG. 2, motor 219 can be positioned within base 14 in a position near the location of hinge 218 or the attachment thereof with base 14. Motor 219 can be operatively connected with a portion of the hinge structure 218. In the example shown, an operative connection is represented schematically by connection 221 that can include an interconnection between motor 219, which is affixed within base 14, to a portion 218A of the hinge structure 218, such as an axle, pin or other feature that is in a fixed position relative to lid 12 and is rotatably coupled to base 14. Such a connection 221 can be made through one or a series of gears, levers, or pulleys that are configured to be driven by motor 219. The connection 221 can provide an appropriate transfer of power, for example, the connection's location, type (e.g., linear or rotational), and/or reduction of force can be applied rotationally to lid 12 via portion 218A of hinge 218. As used herein, the motor can include any type of system or mechanism designed to provide rotational or linear movement to an object. That is, the term motor is used broadly in a sense that can encompass a variety of motors, including coil and magnet based electromotors, as well as linear-drive devices, such as actuators or other non-electrically driven motors.

Figure 2:
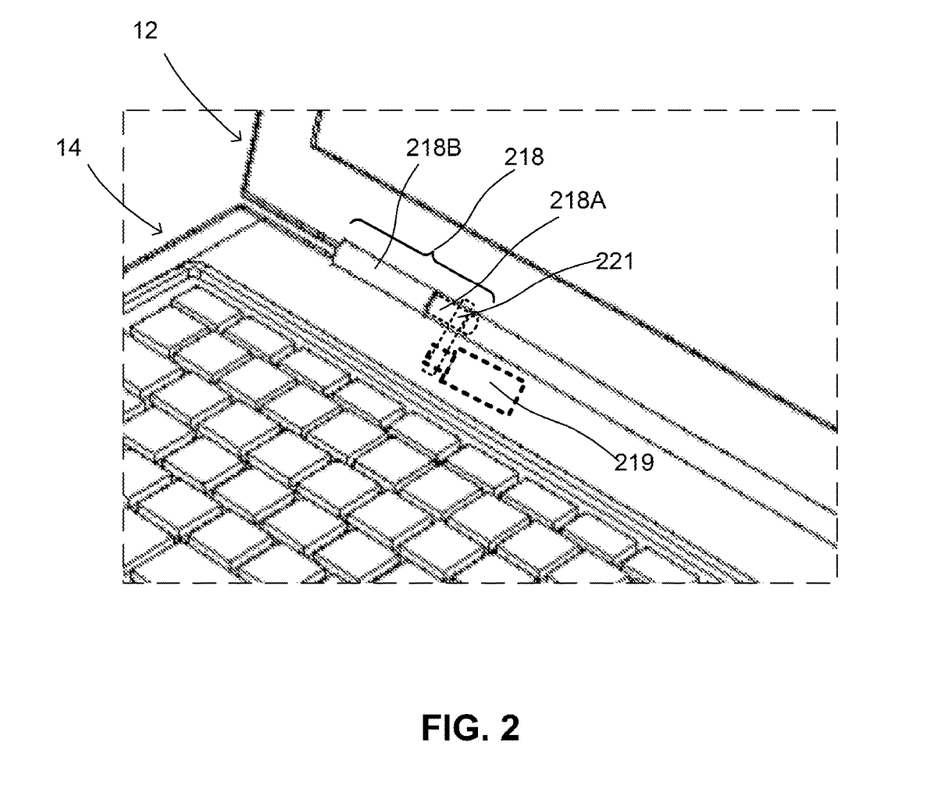
FIG. 2 illustrates a computer with a motorized hinge structure in accordance with aspects of the disclosure.

In another example, motor 219 may be directly connected to the hinge. It may be positioned within hinge 218 and can, if necessary, include internal reduction to provide a desired amount of torque. In an example, hinge 218 can include internal friction elements configured to resist the weight of lid (with included tolerances to resist sudden movement) to maintain a user-selected position thereof. In this case, motor 219 and the connection 221 with hinge 218 can be configured such that the torque (or rotational force) applied to hinge 218 is sufficient to overcome such force and to rotate lid 12 at a desired speed. In another example, the resistance may be controlled by a processor so that the resistance is significantly reduced or eliminated when the motor is repositioning the lid and reactivates with the motor is not active.

As shown in FIG. 2, hinge 218 may be a single unit with a single portion 218A affixed to the base 14, and one or more portions 218B are connected with lid 12 (or vice versa). In such an example, a single motor 219 may be included within base 14 and can be connected with one or both of the two portions 218b connected with lid 12. In another example, there may be multiple motors wherein hinge portion 218a that can respectively be connected with portions 218b. Still further, a variation of computer 10 may have two entirely separate hinge bodies with at least one respective dedicated motor associated therewith. Alternatively, only a single hinge may be motorized. The motors may be located in the base assembly 14, as shown, and/or in the lid assembly 12. The motors may be in communication with a processor internal to computer 10, which may be capable of instructing or controlling the movement of the motors. Such a processor may be the central processing unit ("CPU") of the computer 10. Alternatively, a dedicated processor can be included within computer 10 to control the operation of motor 219, which can include memory for storing instructions for either direct operation or appropriate communication with the CPU for co-operative control of motor 219.

The processor may be capable of triggering an open or close procedure that causes the motor to adjust the position of the lid assembly. The triggering may be based on the geographic proximity of a user, for example, when the user approaches the computer it may automatically open and unlock or when the user moves away from the computer it may automatically close and lock. The triggering may also be based on a preconfigured timer (e.g., scheduler) or a command issued by the user. A command may be based on direct or indirect physical contact, for example, the user may contact a touch-sensitive surface of the computer. A command may also be a verbal command (e.g., "open laptop" "close laptop"), a clapping action, or clicking a button (implemented in hardware or software) on the computer 10 or another device e.g., phone.

Figure 3:
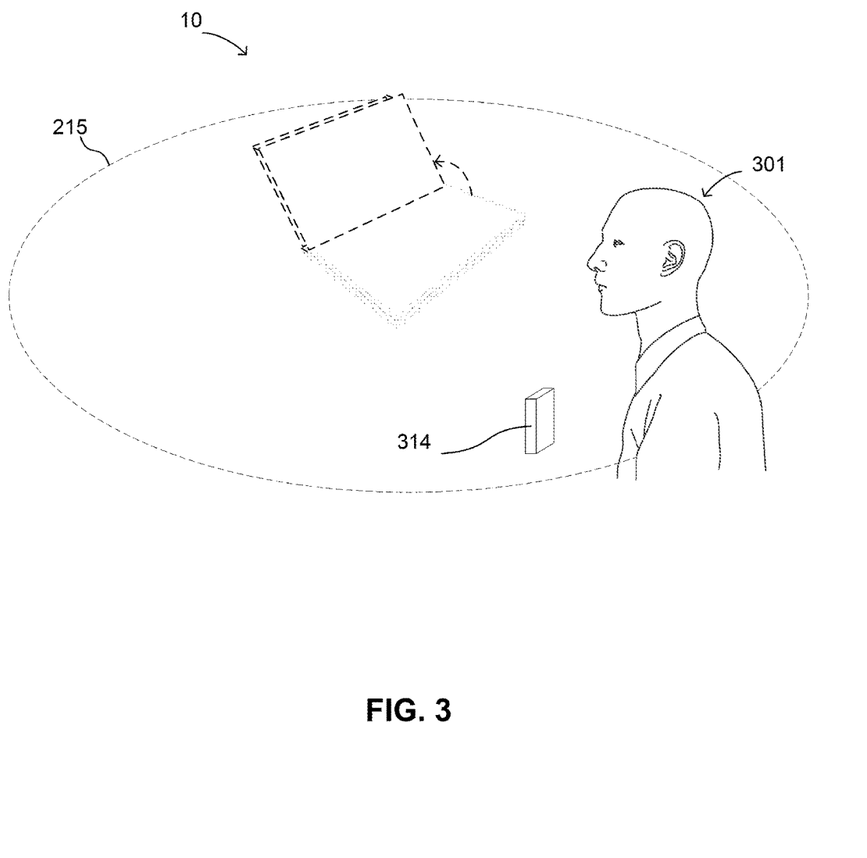
FIG. 3 illustrates a computer automatically opening when a user is within a geographic threshold distance in accordance with aspects of the disclosure.

Computer 10 may have one or more sensors that are capable of detecting the presence of nearby objects without physical contact with computer 10. As shown in FIG. 3, computer 10 may have a sensor configured to detect when user 301 enters a predetermined threshold distance 215. The sensor may be an active sensor that is capable of emitting an electromagnetic field or beam of radiation and capable of detecting changes in the field or radiation. Alternatively, the sensor may be a passive sensor that merely detects energy and does not emit any energy, such as a photo sensor or microphone.

The object detected by the sensor is referred to herein as the target or proximity target. The sensor's target may be user 301 or a device in the user's possession. The device may be on the user's body or in the immediate vicinity of the user such as phone 310, key fob, keycard, smart watch, article of clothing with an embedded tag, or any other similar device. For example, the device may be a Radio Frequency Identification (RFID) tag that can be recognized from a distance.

Computer 10 may have a sensor that implements any one of a variety of technologies for identifying a user and detecting when the user is geographically proximate to computer 10. For example, computer 10 may include one or more sensors configured to function as a Near Field Communication (NFC) receiver, Bluetooth communication circuitry, or RFID transceiver/transponder. The sensor may implement a technology capable of determining a users's location in relation to the computer, for example, that the user is in front of the computer, or behind the computer or to the side of the computer. Alternatively, even if the technology used by the sensor is not capable of detecting a user's geographic location it may still function as a proximity sensor and detect the user is within a threshold distance. For example, bluetooth circuitry is not designed to detect a user's location, however if the bluetooth circuitry has a known maximum range (e.g., 30 meters) and the computer is able to pair with a device in the user's possession it can be used to infer that the user is within a 30 meter perimeter of the computer.

Threshold distance 215 may vary depending on the technology used. The ideal threshold distance for the sensor may be between 2-5 meters so that as a user approaches, the processor may trigger an open procedure and have the computer lid open prior to the user arrival. Threshold distance 215 may be set to the maximum distance of the technology being used. By way of example only, if NFC is used, the threshold distance 215 may be less than a meter, whereas if Bluetooth is used, the threshold distance 215 may be as large as 30-100 meters. Having a larger threshold distance 215 may be appropriate if the user wishes to provide additional time for computer 10 to perform an open or unlock procedure, which may include powering up computer 10 or waking computer 10 from a sleep mode. Threshold distance 215 may also be set to a value as small as 0 meters, which would require direct contact by the target device e.g., user or device.

Figure 4:
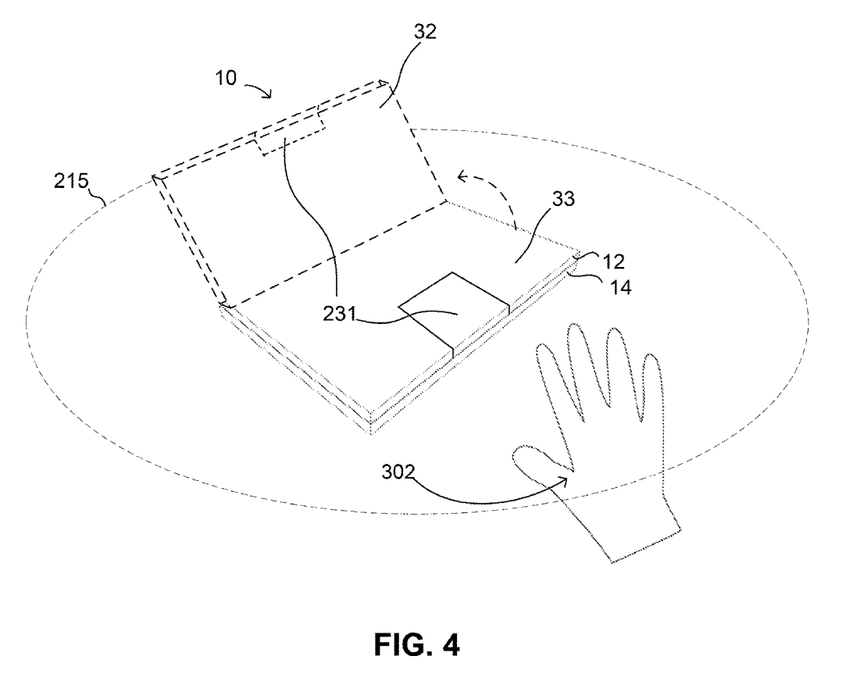
FIG. 4 illustrates a computer automatically opening when user makes contact with the computer's touch-sensitive surface in accordance with aspects of the disclosure.

Computer 10 may also include a touch-sensitive surface 231 located in an area accessible to the user. As shown in FIG. 4, computer 10 may have touch sensitive surface 231 positioned on outer surface 33 of lid assembly 12 so that user 301 may contact touch-sensitive surface 231 when computer 10 is in the closed position. In one example, touch-sensitive surface 231 may be in a shape approximating a rectangle, with a portion of touch-sensitive surface 231 wrapping around from outer surface 33 of lid assembly 12 to inside surface 32 of lid assembly 12. This may allow the user to easily contact the touch-sensitive surface 231 when the computer is in a closed position, open position or only partially opened position. Computer 10 can be configured to read the touch information collected by touch-sensitive surface 410 in order to detect taps, touches, or gestures of the user.

Touch-sensitive surface 231 may be any type of material that is capable of receiving touch input from a user such as by a capacitive structure, surface acoustic wave, or a resistive structure. In one example, computer lid assembly 12 may be interconnected with touch-sensitive circuitry. This allows a standard computer lid, for example, to be capable of detecting the touch of a user, and thus acting as a touch-sensitive surface without requiring an additional material on the lid. Alternatively, a lid assembly 12 with an outer housing of plastic or aluminum can define a window or other opening or cutout in which a dielectric surface can be present for access thereto by a user.

The user's contact with touch-sensitive surface 231 may cause the computer to open, close, or adjust the position of lid assembly 12. The contact may itself be sufficient to trigger the opening or the contact may be a step in a triggering sequence that further includes proximity-based detection provided by the sensor, as discussed above. As shown in FIG. 4, the user 301 is within the threshold distance 215 and user's hand 302 is in contact with touch-sensitive surface 231 on outer portion 33 of lid assembly 12. This results in computer 10 executing a procedure or sequence to open lid 12 relative to base 14 (an "opening procedure"). The opening procedure includes the motorized hinge 218 moving lid assembly 12 into an opened position.

Computer 10 may include a sensor that is an image sensor and that can function as a proximity sensor for detecting the user. The image sensor may be a forward-facing camera capable of capturing an image of the user when the computer is in an open position. There may also be a rear-facing camera capable of capturing an image of the user when the computer is in the closed position. The image received from the camera(s) may be used to detect a potential user or recognize a specific user as well as calculate or estimate the distance of a target (e.g., user or object). Computer 10 may have multiple cameras that face in a similar direction and provide a stereoscopic image so as to be able to make such a calculation or estimate.

Figure 5A:
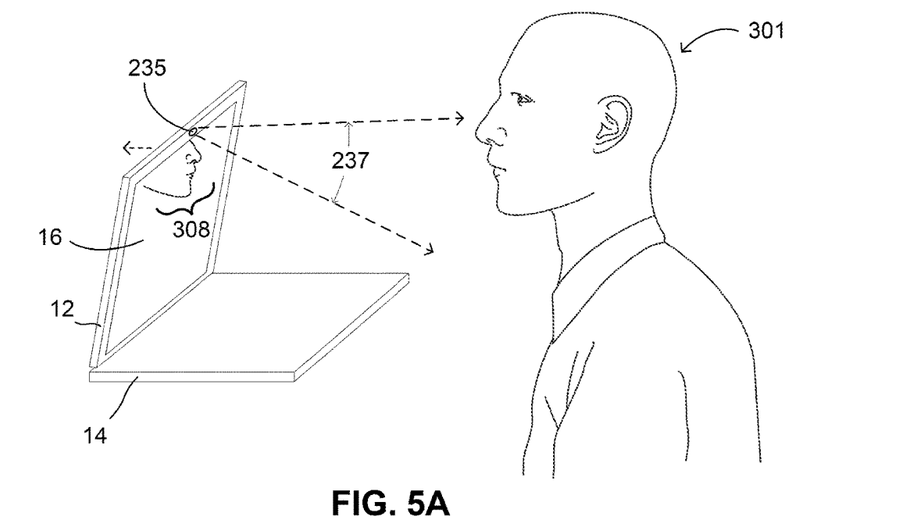
FIGS. 5A-B illustrate a computer automatically adjusting the lid assembly in order to have the user's face in the camera's field of view in accordance with aspects of the disclosure.

As shown in FIG. 5A, the computer may include front-facing camera 235 on lid assembly 12 adjacent to screen 16. Front-facing camera 235 has field of view 237 that may be relative to the position of lid assembly 12. As lid assembly 12 opens, the camera's field of view 237 may rotate upward and as lid assembly 12 closes the camera's field of view 237 may rotate downward. The camera is configured to capture an image, or a series of images in the form of a video, and communicate the image(s) to the processor.

Figure 5B:
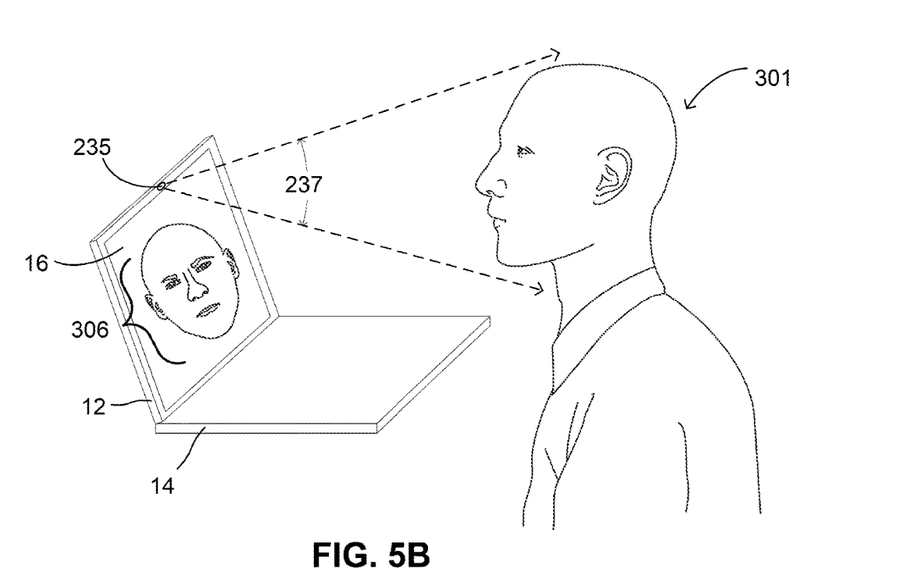

The processor may be configured to analyze the image(s) and perform digital image processing to detected objects in the image. For example as seen in FIG. 5A, the processor has detected a portion 308 of the user's body, e.g., chin. When the portion 308 is detected, the processor may instruct the motorized hinge to move lid assembly 12 such that the user's entire face 306 is within the center portion of camera's field of view 237, as shown in FIG. 5B.

Once the processor locates and centers the camera's field of view on the user's face the processor may continuously adjust the position of the lid in order to maintain that centering. For example, if user is initially sitting down and the user then stands up, the processor will detect the change in the location of the user's face and adjust the position of lid assembly 12 by rotating toward the fully open position in order to have the user's face remain in the middle portion of the camera. Conversely, if user is initially standing and the user then sits down, the processor will detect the change in the location of the users face and adjust the position of lid assembly 12 by rotating toward the closed position in order to have the user's face remain in the middle portion of the camera. This may be particularly useful, for example, during a video conference.

If the processor determines the face of the user is not currently within the field of view of the camera, the processor may use object detection to classify what is currently in view and predict the location of the user's face. For example, if the image processing detects a body part (e.g., torso, shoulder, arm), article of clothing, and/or accessory (e.g., hat, belt, shoe) it may use this to predict the location of the face, e.g., above the torso or below the hat. It may then instruct the motorized hinge to rotate the lid toward the open position or closed position in order to alter the cameras field of view. It will continue to adjust the lid until the face is in the center portion of the cameras field of view. If the processor is not able to predict the location of the face it may instruct that a searching mode be implemented by panning movement of lid 12. This can be done by utilizing motorized hinge 218 to adjust or rotate lid assembly 12 throughout at least a portion of the rotational range of motion thereof in an effort to locate the face of the user. The panning motion may cover the entire range of motion capable by the hinge or only a portion of the range above or below the current position (e.g., as little as a fraction of a degree to as much as 180°). In another example, if the user is not detected (e.g. after a predetermined amount of time spent in the searching mode or after a predetermined number of panning cycles) computer 10 may close and/or lock itself.

Figure 6A:
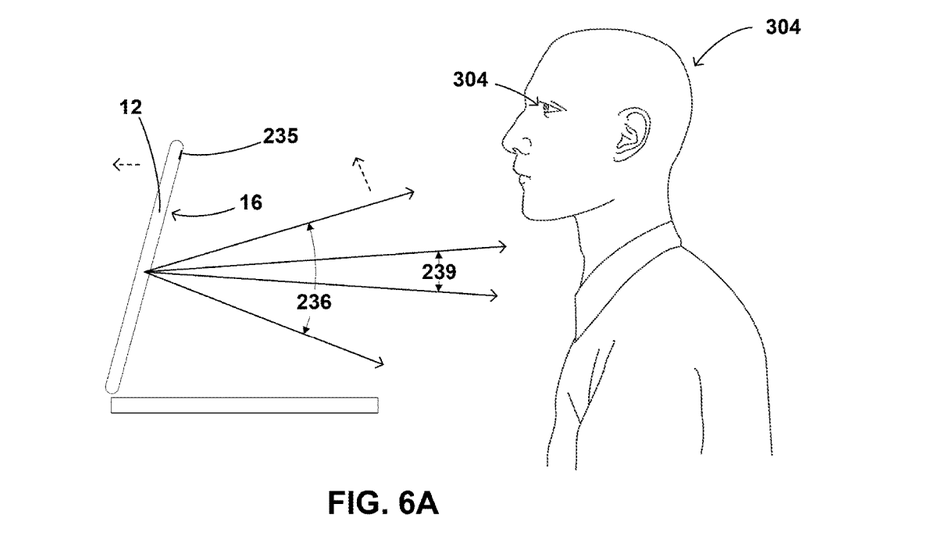
FIGS. 6A-B illustrates a computer automatically adjusting the lid assembly in order to provide the user with the optimum viewing angle in accordance with aspects of the disclosure.

Computer 10 may also adjust the position of lid assembly 12 so that user 301 has an optimum view of screen 16. As shown in FIG. 6A, screen 16 has a viewing angle 236 with a middle portion 39. The viewing angle 236 is based, for example, on the maximum angle(s) at which a display can be viewed with acceptable visual performance. Middle portion 239 is a subset of viewing angle 236 and includes the viewing angle bisector, which may correlate to the best viewing angle for the user.

Viewing angle 236 may depend on the technology used for the screen and may be measured using any combination of the following criteria: brightness, contrast, sharpness, and color saturation. The viewing angle of various LCD screens, for example, may be based on the contrast ratio wherein the maximum angle is the angle where the contrast ratio exceeds 5:1 or 10:1. An example viewing angle for an LCD screen can be the range of 40°-120° although it could be as large as 180°.

Figure 6B:
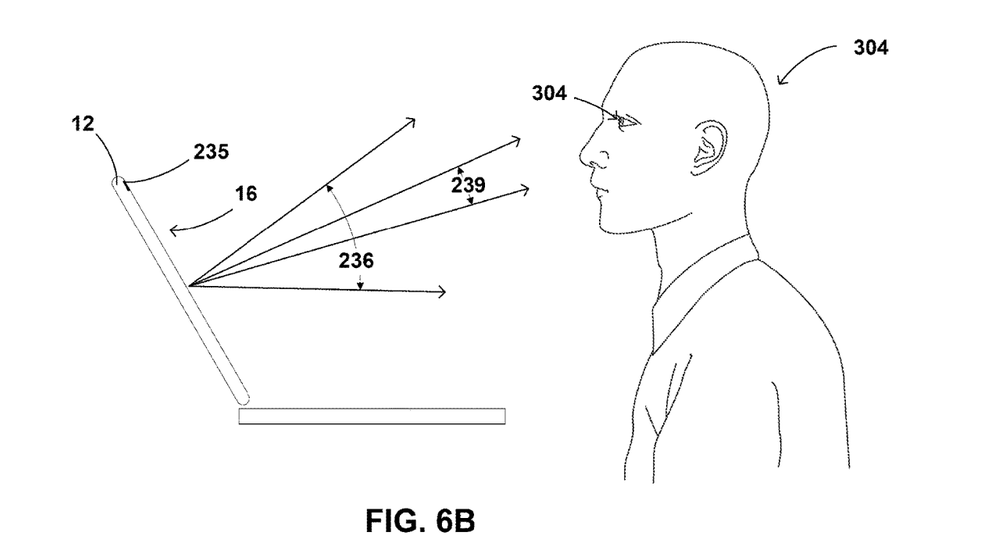

As shown in FIG. 6B, computer 10 may be configured to adjust the position of lid assembly 12 such that the user's eyes 304 are within viewing angle 236 of the screen 16 or are within the middle portion 239 of the viewing angle 236. This may be done by utilizing camera 235 and the processor to detect the location of user's eyes 304. Once the user's eyes 304 have been located the computer can calculate a necessary or useful change in the angular position of the lid such that the user's eyes 304 are within the range of the viewing angle 236.

In an embodiment, the motorized hinge may be powered by an electric motor as well as elastic tension, magnetism or some combination thereof. For example, an electric motor may also be configured to store potential energy produced by the user's opening or closing of the lid assembly. The potential energy may be stored by exerting tension on a spring, deforming an elastic material or by forcing magnets together. This stored energy may then be used to supplement the electric motor or may be sufficient on its own to adjust the lid assembly toward a closed or open position.

In another example, computer 10 can include circuitry to use manual opening and closing of lid assembly 12 to carry out a regenerative function to power motor 219. Such a regenerative function can include using the load applied to motor 219 during forced movement thereof as generators that can, through appropriate circuitry, be used to charge the battery included in computer 10 for use during automatic opening and closing of lid 10, or movement thereof during repositioning, or general functions of computer 10. As an alternative, one or more capacitors or array of capacitors can be included to store such energy and can be connected directly with motor 219 to store energy from motor 219 during the regenerative function and to provide power for motor 219 in parallel with the computer's battery.

Figure 7A:
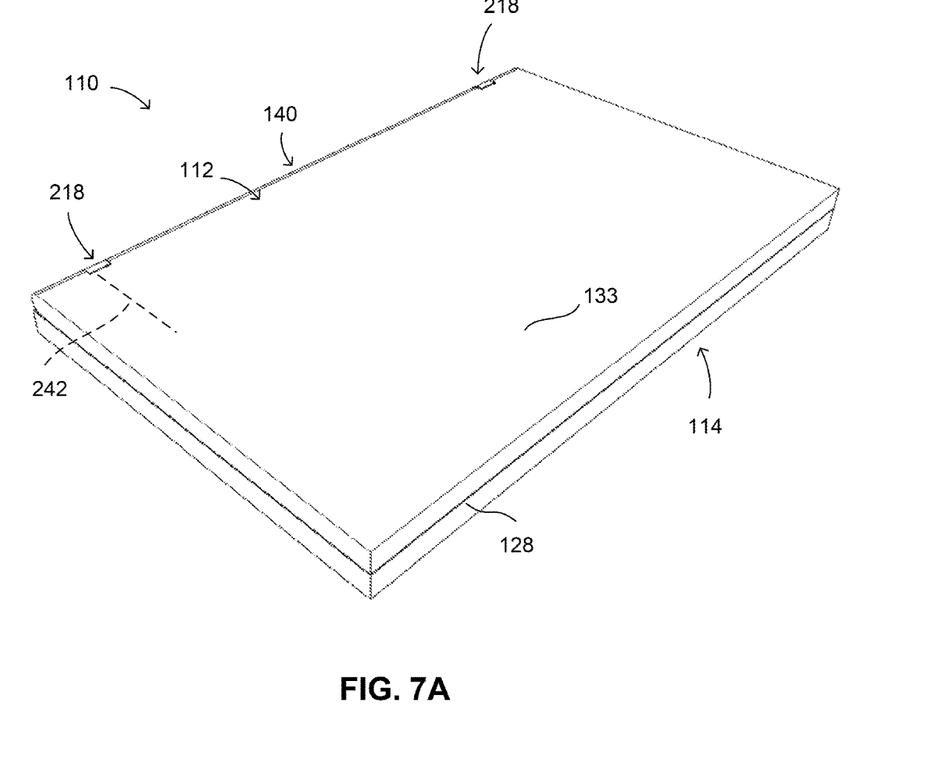
FIG. 7A illustrates a notebook computer with a different hinge structure in accordance with aspects of the disclosure.
Figure 7B:
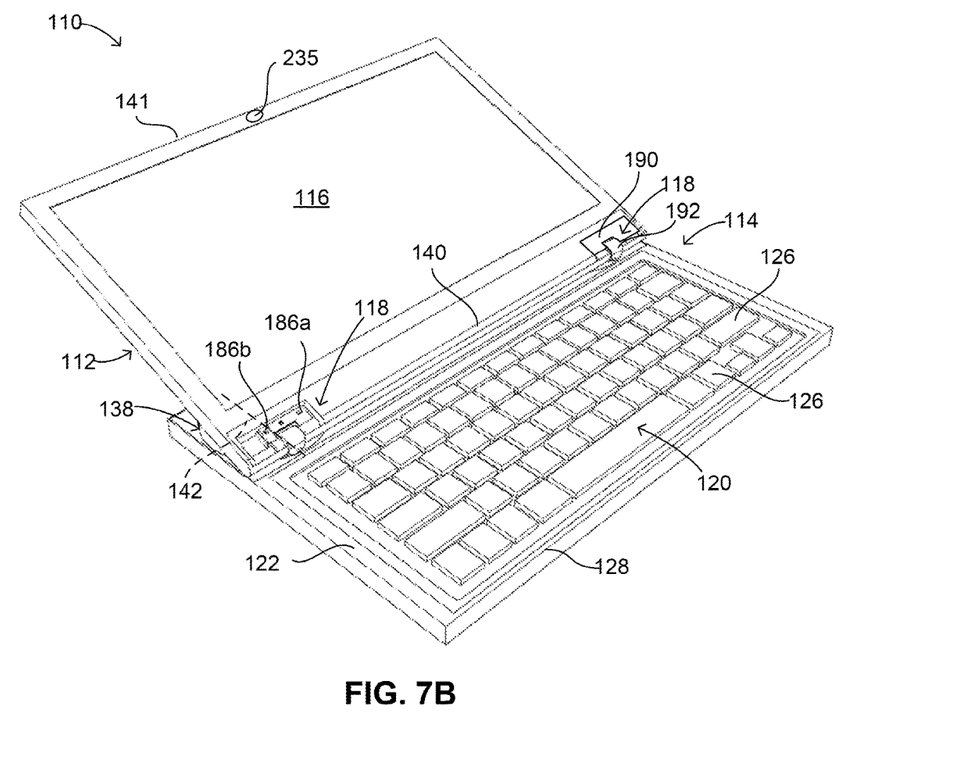
FIG. 7B illustrates the notebook computer of FIG. 7A in an open position.

FIGS. 7A and 7B show a portable computer 110 in a form that is similar in some respects to the computer discussed above with respect to FIGS. 1A, 1B, and 2. Computer 110 can include a base 114 configured to rest on a surface and to support a lid 112 including a screen 116. Lid 112 is connected to a hinge 218 that is itself attached to a mounting assembly 138 within base 114. Such connections allow the lid 112 to close against the base 114, as shown in FIG. 7A, and to be opened by rotation away therefrom into a user-selectable viewing position during use of computer 110, an example of which is shown in FIG. 7B.

In an example, computer 110 can be configured with transparent touch-sensitive circuitry positioned between the display and the outer substrate or cover glass associated with screen 116. Such circuitry can be of any type that is capable of receiving touch input from a user such as by a capacitive structure, surface acoustic wave, or a resistive structure. By including such circuitry, screen 116 can be configured as a touchscreen that detects the location of a touch, or multiple touches by a user. The computer 110 can be configured to read the touch information collected by the screen 116 to detect taps, touches, or gestures of the user using, for example a finger or multiple fingers. The computer 110 can be further configured to interpret these interactions with the screen 116, allowing the user to control various functions of the computer 110 using screen 116. In a further example, computer 110 can be configured without a trackpad or other secondary input, allowing the user to interact with screen 116 and keyboard 120 alone during use of computer 110 (or additionally with a peripheral input device, such as a mouse or the like that is externally connected with computer 110).

In an example of computer 110 that includes both touchscreen 116 and keyboard 120 input, a screen 116 position that is at an angle between about 120 degrees and 160 degrees with respect to face 122 can facilitate use of computer 110, particularly during use in which a user actively or frequently switches from keyboard input to screen input. In one example a screen position of about 155 degrees (+/−5%) from upper face 122 of base 114 can facilitate such use. The above-described positioning of screen 116 can be compared to other clamshell notebook computer configurations, which include a trackpad or other input device, a keyboard and a screen that is not configured as a touch input (or may accept touch input but is not intended as a primary input). In such configurations, the screen can be comfortably used in a range of between about 90 degrees and 110 degrees from the top surface of the corresponding base. However, the rear-hinged computer configurations described elsewhere, may not be easily used at the increased angles that may be preferred during frequent or heavy touchscreen use. Examples of the present hinge 218 and mounting assembly 138 can provide a computer 110 in which the lid 112 can be positioned at an angle of between, for example, 130° and 160° relative to face 122, while also causing constrained translational movement of the lower edge 144 of lid 112 along path 242, toward keyboard 120 and toward the user, which can provide a decreased footprint for computer 110, enhanced stability, and/or improved comfort for the user during use of touchscreen, as further described in the 3.0-1206 Application.

Accordingly, computer 110 and may lead to additional positioning and/or change of position by the user during various types of use than those discussed above with respect to computer 110. For example, a user who is involved in activity including heavy use of touchscreen 116 may be positioned in a position above or nearly above computer 110 so as to look downward at screen 116, with lid correspondingly angled back at an angle of, for example 130-155° with respect to base 114. During the course of using computer 110, the user may move from such a position, such as to a more traditional, upright position during heavy keyboard use (e.g. during typing) or may sit back and/or move frequently, such as during video conferencing, as discussed in the examples above, or while viewing video or "passively" using computer 110. Accordingly, the incorporation of one or more motors 219 into computer 110, with similar functionality and operation to those discussed above with respect to computer 110 can be incorporated into computer 110, as will be discussed below. Although lid assembly 112 is shown and described as moving both rotationally and translationally herein, automated movement of lid 112, as driven by motor 219 controlled by a processor, can be based primarily on rotation thereof and can be done according to the criteria discussed above with respect to computer 110. It is further noted that movement of lid 112 for appropriate positioning of camera 235 with respect to user 301 based on facial recognition, can operate largely independent of whether such positioning is influenced by the rotation or translation of lid 112.

As shown in FIGS. 7A and 7B, lid 112 is attached to a pair of spaced-apart hinges 218 that lie along lower edge 140 of lid 112 to provide for rotation of lid 112 with respect to base 114. Hinges 218 are attached to base within respective mounting assemblies 238 included therein. As described further below, mounting assemblies 238 are configured to move hinges 218 substantially along linear path 242 through movement thereof that is constrained relative to the rotation of lid 112. Such a connection allows bottom edge 140 to translate away from back edge 130 of base 114 as lid 112 is rotated to an open position. Similarly, as lid 112 is rotated toward the closed position, bottom edge 140 can slide toward back edge 130 of base 114.

Figure 8:
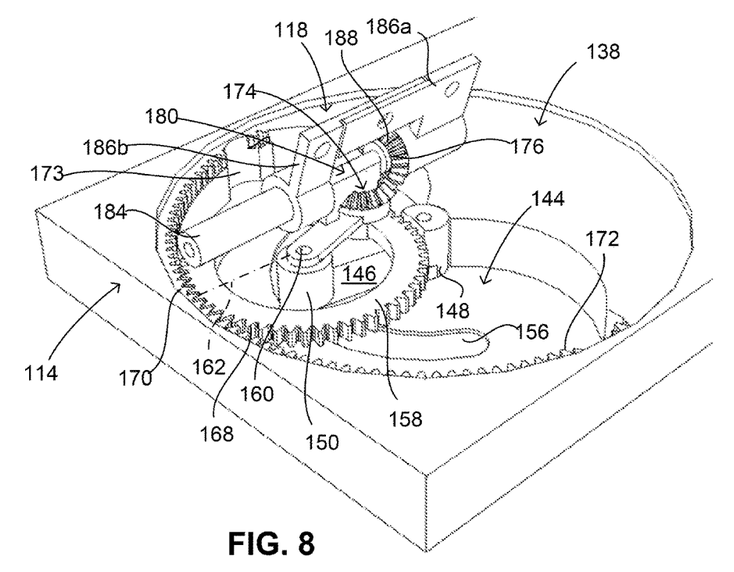
FIG. 8 illustrates an isometric view of the hinge structure in accordance with aspects of the disclosure.
Figure 9:
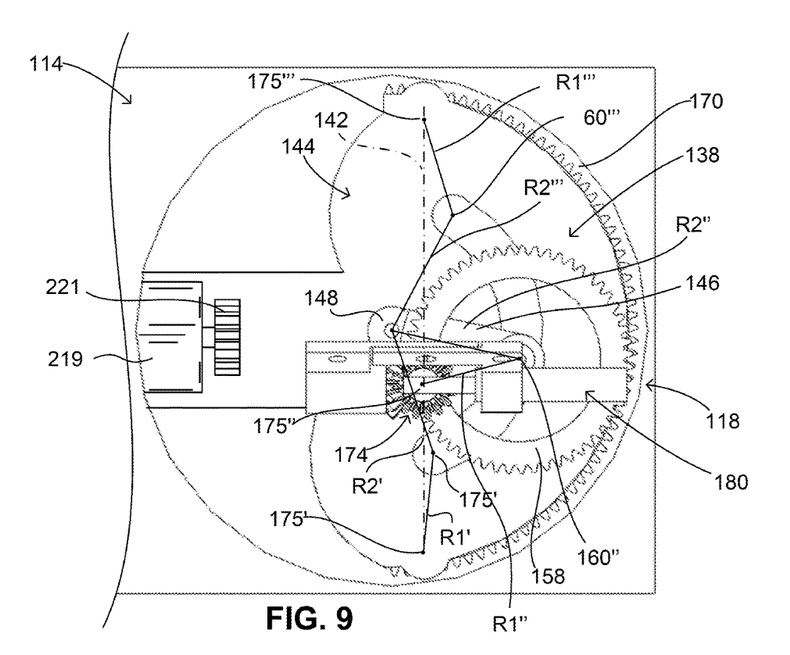
FIG. 9 illustrates a top view of the hinge structure in accordance with aspects of the disclosure.

FIGS. 8 and 9 show internal components of hinge 218 and mounting assembly 138 during various stages of opening and/or closing of lid 112 relative to base 114. As shown, mounting assembly 138 can be attached with base in a cavity 144 therein such that mounting assembly 138 is contained within base 114 or is flush with face 122 thereof. Connector 146 is rotatably mounted within cavity 144 at a first end 148 thereof and extends to a second end 150 thereof that is spaced apart from first end 148 at a length 152 of the connector 146. As shown in FIG. 9, connector 146 is configured to rotate through a predetermined angle 154 relative to base 114. A planetary gear 158 is rotatably affixed at the center 160 thereof on the second end 150 of connector 146. Planetary gear 158 is further configured to extend outwardly from connector 146 to engage with a ring gear 170 that surrounds both the connector 146 and the planetary gear 158. Ring gear is fixed in position with respect to base, and, as shown in FIGS. 8 and 9, can be integrally formed with a portion thereof. Both planetary gear 158 and ring gear 170 are configured with mutually engaging (or "meshing") teeth 168 and 172, respectively, such that planetary gear 158 rotates along a prescribed path within ring gear 170. To ensure that planetary gear 158 follows the path set forth by the mesh engagement between it and ring gear 170, connector, can be configured such that a length thereof is sufficient to maintain planetary gear 158 in a mesh engagement with ring gear 170, while allowing planetary gear 158 to rotate freely along the prescribed path.

An attachment structure 174 is affixed with planetary gear 158 and can, further, be at least partially integrally formed therewith. The affixation of attachment structure 174 with planetary gear 158 is such that attachment structure moves along with planetary gear 158 as planetary gear 158 moves along its prescribed path within ring gear 170. Such movement includes translational movement substantially along path 242 as well as rotation about a central axis thereof through the same rotation as that of planetary gear 156 through its movement. Hinge 218 is connected with attachment structure 174 such that hinge 218 is subject to the same translational movement as attachment structure 174. Hinge 218, however is rotatably affixed within attachment structure, such that it maintains the same rotational relationship with respect to base 114 and lid 112 during the rotational movement of attachment structure 174. To achieve such rotational movement in connection with the rotational movement of the lid 112 relative thereto, hinge 218 can include a coupler 180 that can include a vertical projection 182 that is configured to extend into and rotationally attach within a hole 178 in attachment structure 174 so that it extends coaxially with the rotational center of attachment structure 174. Coupler 180 further includes at least one horizontal projection 184 about which lid can rotate about an axis perpendicular to the direction of rotation of the attachment structure 174.

Hinge 218 further includes a driving bracket 186a that is rotationally disposed on a horizontal projection 184a. Driving bracket 186a attaches to lid 112 to rotatably attach lid 112 to hinge 218 and, accordingly, to base 114. Driving bracket 186a includes a first bevel gear 188 that is affixed therewith such that first bevel gear 188 is rotated by rotation of driving bracket 186a (by rotation of lid 112, for example). First bevel gear 188 is positioned to mesh with a second bevel gear 176 included in attachment feature 174. Second bevel gear 176 is rigidly attached with planetary gear 158 such that rotation thereof causes rotation of planetary gear 158 within ring gear 170, which, as discussed above, causes translational movement of attachment feature 174 (and correspondingly, hinge 218 and lower edge of lid 140) substantially along path 142. As shown in FIGS. 8-9, such rotation of second bevel gear 176 can be caused, or driven, by rotation of first bevel gear 188, which is meshed with second bevel gear 176. The incorporation of bevel gears in such structure allows for rotational movement along one axis (i.e. the axis of horizontal projection 184a) to be translated to rotational movement along another axis (i.e. the axis of vertical projection 182). Accordingly, the structure achieved by the above-described assembly of hinge 218 with mounting assembly 138 can cause translational movement of lower edge 140 of lid 112 based on rotation of lid 112 away from base 114.

As further shown in FIGS. 8 and 9, both hinge 218 and mounting assembly 138 can be configured to provide for the above-described constrained rotational and translational movement through desired, corresponding ranges. The top plan view shown in FIG. 9 shows features of hinge 218 and mounting assembly 138 during an intermediate position of the respective ranges of motion thereof. The position of the mounting assembly 138 and hinge 218 shown in FIG. 9 corresponds to the positions thereof shown in the perspective view of FIG. 8. FIG. 9 also schematically depicts the positioning of various features of mounting assembly 138 in the fully open position (corresponding to FIG. 7B) as well as the fully closed position (which correspond to FIG. 7A) to illustrate the range of constrained motion of the various features. The positioning of lid 112 as shown in FIG. 7A which corresponds to the positioning of planetary gear 158 and connector 146 indicated by center 175' of attachment feature 174 in FIG. 9 and the corresponding positions or R1', R2', and center 160' of planetary gear 158.

Similarly, the exemplary intermediate positioning of brackets 186a and 186b shown in FIG. 8 (which dictates the positioning of lid 112 in such an arrangement) corresponds with the positioning of planetary gear 158 and connector 146 indicated by center 175" of attachment feature 174 in FIG. 9 and the corresponding positions or R1", R2", and center 160" of planetary gear 158. Finally, the fully open positioning of lid shown in FIG. 7B corresponds with the positioning of planetary gear 158 and connector 146 indicated by center 175''' of attachment feature 174 in FIG. 9 and the corresponding positions or R1''', R2''', and center 160''' of planetary gear 158. Accordingly, the translational movement of lower edge 140 of lid is driven by the rotation of lid 112 during opening and closing thereof.

The mechanism of mounting assembly 138, as depicted for example in FIGS. 8-9 can be concealed, as shown in FIGS. 7A and 7B, by a pair of disk-shaped covers. For example, an outer cover can be attached with connector 146 (such as by attachment with first end 148) and can be sized to match the size of cavity 144. Both cavity 144 and the outer cover can be circular and can be larger than the diameter of ring gear 170 so that the outer cover can rotate with the rotation of connector 146 and such that it can fully cover ring gear 170. An inner cover can be attached with planetary gear 158 and can fit within a corresponding circular hole in the outer cover. Attachment feature 174 can extend through the inner cover such that it can rotate freely with planetary gear 158. Accordingly, the opening in the outer cover can be sized to accommodate the rotation of attachment feature 174, which extends therethrough as well. The inner and outer covers can be configured to overlap along portions thereof to provide an enclosure for mounting assembly 138 relative to base 114 to prevent dust or other debris from entering base 114 therethrough, which could disrupt the operation of hinge 218 and mounting assembly 136 or could damage internal components of base 114.

The mechanism shown herein can be fitted with a motor, in a manner similar to that discussed above with respect to computer 110 to provide for automatic opening and closing of lid 112 in a manner similar thereto. For example, a motor, actuator, or the like can be incorporated into mounting assembly 138 to cause the above-described movement thereof between the closed and open positions, which can drive the rotation of lid 112 relative to base 114 (as opposed to manual rotation of lid 112 driving the movement of the components of mounting assembly 138). Such a motor can be positioned within base 114, such as within cavity 144 or an adjacent portion thereof, and can be configured through gears, belts, or the like to attach with and drive rotation of connector 146, for example by connection with first end 148 or with outer cover 166.

In the example shown in FIG. 9, motor 219 can be included within cavity 144 such that the connection thereof, shown in the form of a gear 221, can connect with a portion of mounting assembly 138 within base assembly 114. Because, as described above, the components of mounting assembly 138 as well as the components of hinge 218 are constrained in movement among each other. Motor 219 can be connected in a driving relationship with any of the features thereof, as desired for factors including appropriate reduction, positioning of motor 219 (which can be moved from the example positioning shown in FIG. 9), robustness of the structure, and reliability thereof. In the example shown, motor 219 is positioned such that gear 221 can mesh with corresponding teeth formed on an inside, adjacent surface or outer cover 164. Because outer cover 164 is affixed with connector 146, motor 219 can accordingly drive rotation of connector 146 to cause movement of lid 112, including rotation and translation thereof to provide for appropriate positioning thereof.

In another example, a connection can alternatively be made between motor 219 and first end 148 of connector 144 (such as by additional gears, pulleys or the like. As a further alternative, a motor in the form of an actuator can be attached by one or more linkage members to connector 146, including toward the center 160 of planetary gear 158 such that linear movement can be used to drive the above-described movement of lid 112. Still further, such a linear actuator can be connected to attachment feature 174 (in a manner that does not hinder the rotation thereof) to directly cause movement thereof in the direction along path 142. In a further example, computer 110 may have multiple motors 219, each directly connected to a respective one of the two mounting assemblies 138 included therein.

Figure 10:
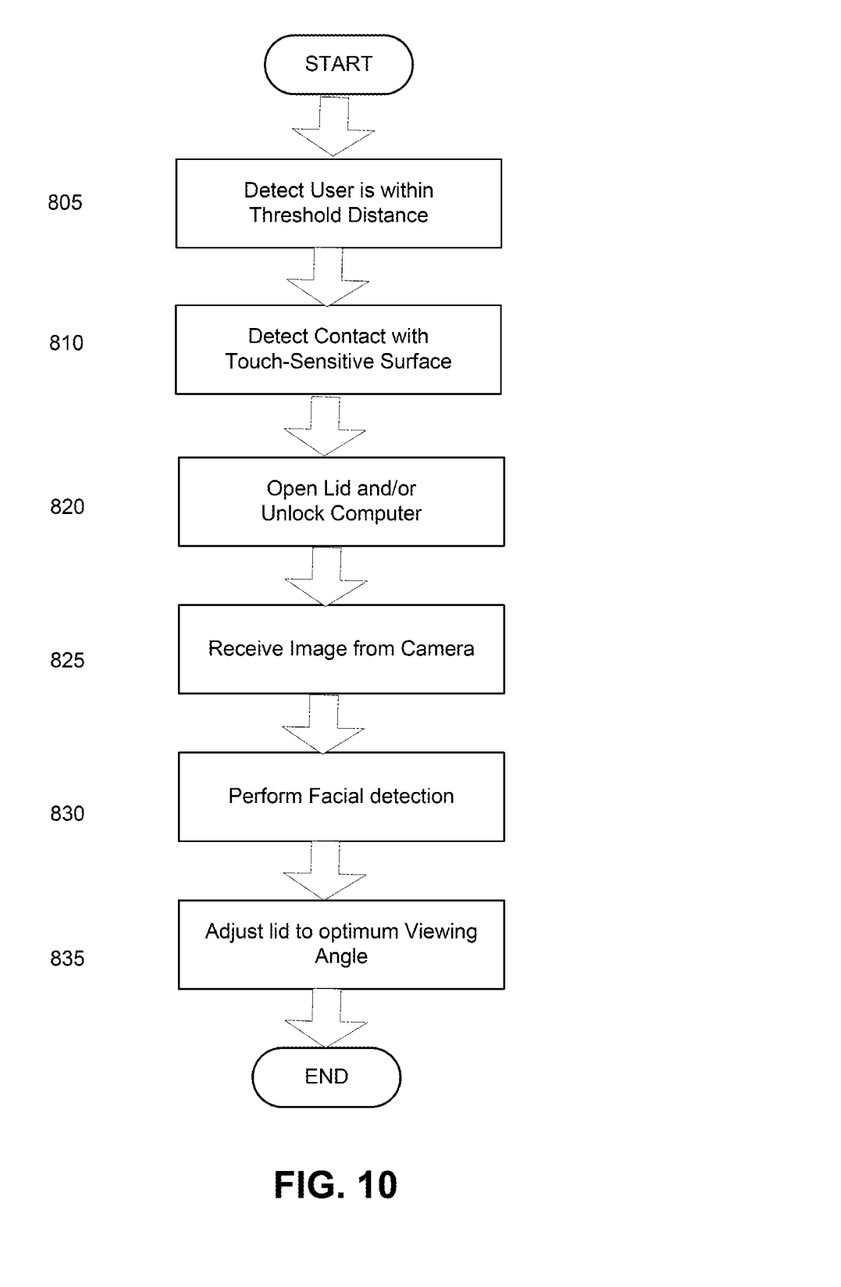
FIG. 10 illustrates a flow chart of steps executed by the processor to automatically adjust position of the lid assembly.

As discussed above, both computer examples 10 and 110, described herein, as well as other examples thereof, may include a processor or multiple processors that are configured to execute a series of steps to adjust the position of the laptop lid. FIG. 10 shows an example of such a sequence that can implement variations or one or more of the various processes or modes described above. In the example sequence of FIG. 10, the processor may detect a user is within a threshold distance, as seen in step 805. The threshold distance may be a predetermined threshold distance defined by the computer manufacturer or user.

As seen in step 810 and 820, the processor may detect direct contact of a user via a touch-sensitive surface and subsequently execute an open procedure to open the lid assembly and execute an unlock procedure to unlock the computer. The unlock procedure may include waking up the computer from sleep or standby mode, restoring from hibernation, powering up the computer, or logging the user into the operating system or application. The unlock procedure may involve accessing the users credentials (e.g., user name and password) and automatically inserting them where appropriate.

The open and unlock procedures may have different levels of security. For example the open procedure may require detection of only a potential user e.g., any person, whereas the unlock procedure may require a specific user be identified or recognized. The processor may detect a potential user by using a rear-facing camera and performing general object detection or by using a microphone and performing sonar or acoustic detection.

Prior to unlocking the computer, the processor can be configured to require authentication of the user. The authentication may be performed using NFC, bluetooth pairing, voice recognition, facial recognition, iris(eye)recognition, or gesture recognition via the touch-sensitive surface or camera. The authentication may be based on a single method or a combination of methods.

The open procedure and unlock procedure may be done simultaneously or one procedure may be executed first and the other procedure done later. In an example, the open procedure can be implemented prior to the unlock procedure so that once the computer lid assembly is opened other features of computer 10 can be exposed for use by the processor or user in the authentication step. For example, there may be a front-facing camera that may have a higher resolution or better view of the user's face, which may assist with facial recognition. In addition, the computer's keyboard may be exposed which would allow the user manually insert his credentials.

As seen in step 825 the processor may be configured to receive an image from camera 535 and perform facial and/or eye detection, as discussed above with respect to FIGS. 5A-6B. Upon detecting a portion of the user's face the processor may instruct the motor to activate the hinge and adjust the lid such that the user's eye is within viewing angle 236. In addition, the processor may then further adjust the position of the lid such that the user's face is in the middle portion of the camera's field of view 236.

The processor may use data from additional sensors to dynamically adjust when the open or unlock procedure is executed. In one example, computer 10 may include additional sensors such as an accelerometer and/or an ambient light sensor. The processor may use these sensors in conjunction with other sensors to detect characteristics or aspects of the surroundings of computer 10. For example, the processor may detect, via an accelerometer, that computer 10 is being moved by comparing the pattern of movement to a movement signature associated with being carried while user is walking. It may also utilize an ambient light sensor to detect that it has been transported from a bright environment to a dark environment and infer that the computer has been relocated to a portable storage container e.g., computer bag, backpack. In response the processor may deactivate the automatic unlock or open procedure.

Although the description herein has been made with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A portable computer, comprising:
a display;
a lid assembly including a first surface having the display disposed thereon, the lid assembly further including a second surface opposite the display;
a base assembly including a surface and a keyboard disposed on a portion of the surface;
a hinge structure configured to attach the lid assembly to the base assembly such that the lid assembly is moveable with respect to the base assembly;
a motor operatively engaged with the hinge structure and configured to cause movement of the lid assembly with respect to the base assembly, including rotation of the lid assembly about the hinge structure toward and away from the base assembly;
a sensor configured to detect a presence of a user within a predetermined threshold distance from the computer;
a processor in communication with the sensor and the motor, the processor configured to adjust a resistance of the hinge structure and to cause the motor to carry out the movement of the lid assembly based on at least one criterion including the presence of the user within the predetermined threshold distance; and
circuitry configured to use manual opening and closing of the lid assembly to carry out a regenerative function to power the motor.

2. The portable computer of claim 1, wherein the sensor is configured to detect the presence of the user within the predetermined threshold distance by establishing communication with a compatible device within a communication range of the sensor.

3. The portable computer of claim 1, further comprising a touch sensitive region defined on the second surface of the lid assembly, wherein the touch sensitive region is in communication with the processor and the opening command is receivable by the computer as a touch input carried out by the user on the touch sensitive region.

4. The portable computer of claim 1, further comprising an image sensor in communication with the processor, the image sensor configured to communicate an image to the processor.

5. The portable computer of claim 4, wherein:
the movement of the lid assembly further includes movement between a closed position, wherein the screen surface is parallel to and adjacent the surface of the base assembly, and an open position, wherein the screen is viewable by a user;
the processor is further configured to carry out facial recognition based on one or more images received from the image sensor; and
wherein the at least one criterion for the processor causing movement of the lid further includes authentication of the user based on the facial recognition.

6. The portable computer of claim 4, wherein:
the image sensor is a camera positioned adjacent the display;
the processor is further configured to perform facial detection based on one or more images obtained by the image sensor and to locate a face of the user; and
the movement of the lid assembly is carried out so as to move the lid into a position such that the user's face is within a predetermined range of a field of view of the camera.

7. The portable computer of claim 4, wherein:
the image sensor is a camera adjacent the display;
the processor is further configured to perform eye detection based on the image obtained by the image sensor and to locate the user's eyes; and
the movement of the lid assembly is carried out so as to position the lid so that a predetermined portion of a viewing angle of the display is aligned with one or both of the user's eyes.

8. The portable computer of claim 1, wherein the lid assembly has a first edge and a second edge, and the motor and hinge structure are configured to move the lid assembly such that the first edge and the second edge of the lid assembly move in respective paths having opposing horizontal directional components.

9. A portable computer comprising:
a display;
a lid assembly including a first surface having the display disposed thereon, the lid assembly defining an edge and including a second surface opposite the display;
a base assembly including a surface, and a keyboard disposed on the surface, the base assembly further defining a first edge and a second edge spaced apart at a depth of the base assembly;
a connection structure coupled to the lid assembly and the base assembly, the connection structure comprising a hinge and being configured such that the lid is moveable with respect to the base assembly by rotation of the lid with respect to the base assembly, whereby the display is moveable toward and away from the keyboard, the lid further being moveable by translation of the edge of the lid assembly along a first path in a direction between the second edge of the base assembly and the keyboard, the connection structure being further configured such that rotation of the lid assembly causes corresponding constrained translation of the edge of the lid assembly;
a motor operatively engaged with the connection structure and configured to cause movement of the lid assembly with respect to the base assembly;
a processor in communication with the motor, the processor configured to cause the motor to carry out the movement of the lid assembly, to reduce or eliminate a hinge resistance when the motor is carrying out the movement of the lid assembly and to revert to an initial hinge resistance when the motor is inactive; and
a sensor configured to detect a presence of a user within a predetermined threshold distance from the computer, wherein the processor is configured to cause the motor to carry out the movement of the lid assembly based on the presence of the user within the predetermined threshold distance.

10. The portable computer of claim 9, wherein the connection structure further includes a first mounting assembly attached with the base assembly between the second edge and the keyboard thereof;
the first mounting assembly includes a first attachment feature that is configured for translational movement that causes the translational movement of the lid; and
the motor is operatively engaged with a portion of the mounting assembly to cause the translational movement of the attachment feature.

11. The portable computer of claim 10, wherein:
the first attachment feature is further configured for rotational movement, the translational movement of the first attachment feature being constrained relative to the rotational movement thereof;
the connection structure further includes a hinge to which the lid assembly is rotatably connected and is rotatably attached to the attachment feature; and
the hinge is attached to the attachment feature so rotation of the attachment feature drives rotation of the lid assembly.

12. The portable computer of claim 10, wherein:
the first mounting assembly includes a ring gear in a fixed position relative to the base assembly, a planetary gear in a mesh arrangement with the ring gear, and a connector rotatably attached to the mounting assembly at a location within the ring gear;
the planetary gear is attached to the connector such that the connector maintains the planetary gear in the mesh arrangement with the ring gear;
the attachment feature is affixed to the planetary gear; and
the motor is operatively engaged with the connector.

13. The portable computer of claim 12, wherein:
the planetary gear is affixed within a first opening in the base assembly;
the motor is at least partially positioned within the opening in the base assembly;
the connector includes a first disk-shaped member that overlies the ring gear and is rotatably positioned within the first opening;
the first disk-shaped member defines a second opening within which the hinge is connected with the planetary gear; and
the motor is operatively engaged with the connector by a gear engaged with the first disk-shaped member.

14. The portable computer of claim 9, further including an input device in communication with the processor, wherein the movement of the lid assembly further includes movement between a closed position in which the screen surface is parallel to and adjacent the surface of the base assembly, and an open position with the screen is viewable by a user, and wherein the processor is configured to cause the motor to carry out the movement of the lid assembly based on a determination that an opening command has been performed by the user.

15. The portable computer of claim 14, wherein the input is a touch sensitive region defined on the second surface of the lid assembly, and wherein the opening command is receivable by the computer as a touch input carried out by the user on the touch sensitive region.

16. The portable computer of claim 9, further comprising an image sensor in communication with the processor, the image sensor configured to communicate an image to the processor, wherein:
the processor is further configured to carry out a facial recognition process based on one or more images received from the processor;
the movement of the lid assembly includes movement between a closed position with the screen surface parallel to and adjacent the surface of the base assembly, and an open position with the screen viewable by a user; and
the processor is configured to cause movement of the lid further upon authentication of the user based on the facial recognition process.

17. A portable computer comprising:
a display;
a lid assembly including a first surface having the display disposed thereon, the lid assembly defining an edge and including a second surface opposite the display;
a base assembly including a surface, and a keyboard disposed on the surface, the base assembly further defining a first edge and a second edge spaced apart at a depth of the base assembly;
a connection structure coupled to the lid assembly and the base assembly, the connection structure and being configured such that the lid is moveable with respect to the base assembly by rotation of the lid with respect to the base assembly, whereby the display is moveable toward and away from the keyboard;
a motor operatively engaged with the connection structure and configured to cause movement of the lid assembly with respect to the base assembly and to store potential energy produced by opening or closing of the lid assembly by a user; and
a processor in communication with the motor, the processor configured to cause the motor to carry out the movement of the lid assembly; and
wherein the motor is configured to serve as a generator using force applied during manual opening and closing to charge at least one of a battery or a capacitor.

18. The portable computer of claim 17, further comprising at least one of:
a spring for storing the potential energy;
an elastic material for storing the potential energy; and
at least two magnets for storing the potential energy.

* * * * *